United States Patent

Willauer, Jr.

[15] 3,661,122
[45] May 9, 1972

[54] WATERING SYSTEM FOR FOWL

[72] Inventor: Charles H. Willauer, Jr., 105 California Road, Quakertown, Pa. 18951

[22] Filed: Apr. 13, 1970

[21] Appl. No.: 27,829

Related U.S. Application Data

[62] Division of Ser. No. 696,893, Jan. 10, 1958, Pat. No. 3,559,621.

[52] U.S. Cl. ................................................ 119/72, 119/81
[51] Int. Cl. ................................................ A01k 07/00
[58] Field of Search ........................ 119/72, 72.5, 74, 75, 27, 18, 119/51.5, 81

[56] References Cited

UNITED STATES PATENTS

| | | | |
|---|---|---|---|
| 1,100,250 | 6/1914 | Norman | 119/74 |
| 3,466,007 | 9/1969 | Launder | 119/72.5 X |
| 2,221,046 | 11/1940 | Gandrud | 119/27 |
| 2,011,684 | 8/1935 | Martin | 119/51.5 |

*Primary Examiner*—Hugh R. Chamblee
*Attorney*—Shaffert and Miller

[57] ABSTRACT

The invention disclosed is an improved low-cost system for watering fowl which maintains without overflow a supply of water at one or more drinking stations, with means for stopping the supply of water at each station individually. A new and simplified supply valve at each station which eliminates the usual causes of valve failure is also a feature of the system disclosed. By utilizing feed troughs as the framework for the system, the invention requires no duplicating supporting structure.

3 Claims, 3 Drawing Figures

PATENTED MAY 9 1972
3,661,122
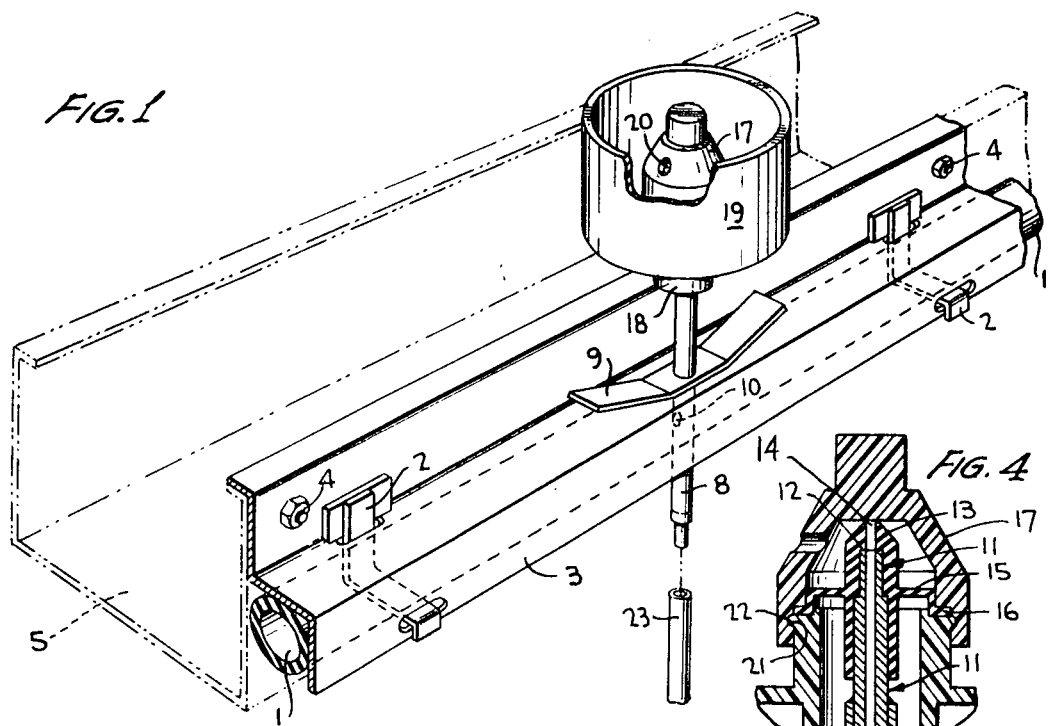
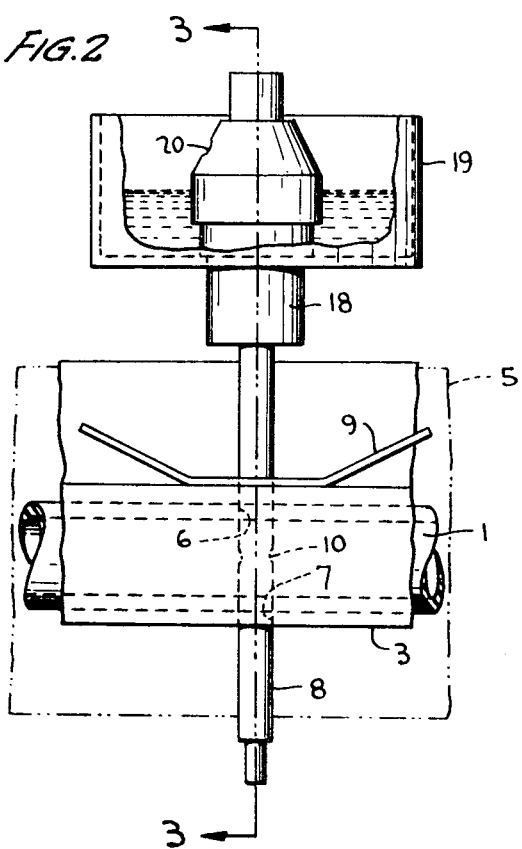
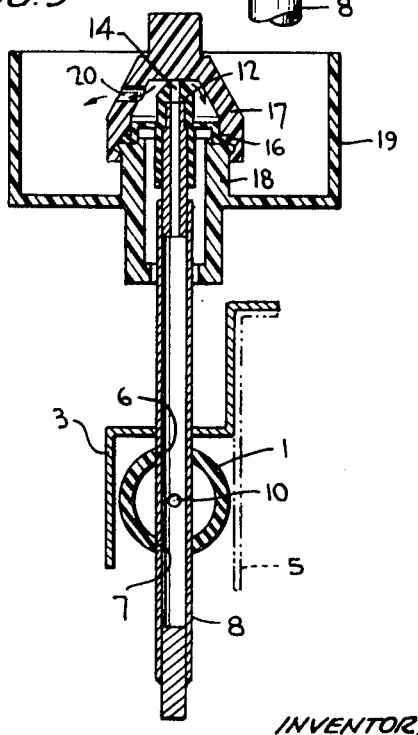
INVENTOR,
CHARLES H. WILLAUER, Jr.

WATERING SYSTEM FOR FOWL

This is a division of application Ser. No. 696,893, filed Jan. 10, 1968, now U.S. Pat. No. 3,559,621.

BACKGROUND OF THE INVENTION

The modern emphasis toward growing fowl under rigidly controlled conditions and away from the practice of allowing fowl almost unrestricted freedom of the barnyard, has brought forth many labor saving devices which have contributed to the automated environment under which fowl are now produced. Retail prices, particularly in the cases of chicken and turkey, have become so competitive with the development of these modern techniques that production cost is now a highly critical factor; there is therefore, a ready market for any device which will lower the acquisition or operating costs of equipment useful in raising fowl.

There are numerous automatic fowl drinkers in the prior art which consist of depressible water receptacles which, when in the lower position close the valve through which the water is supplied to the receptacles. In some devices the drinking receptacle floats in another vessel and moves vertically in relation to the lower vessel as the volume of water in the receptacle changes, thereby opening or closing a water supply valve. Others employ metal springs, which hold the drinking receptacle up and the water valve open, and which allow the receptacle to lower upon filling, thereby closing the water supply valve. In the prior art attachment of the fountain to the water supply is usually by threaded means and it is necessary that the system be secured while repairs are made. The utility of any watering system for fowls depends both upon its original cost and upon its success in dealing with the following common operating problems:
  a. Valve malfunctions due to the sticking of or friction upon parts which should move freely, caused by corrosion, dirt, or deterioration.
  b. Leakage caused by valve seat wear.
  c. Necessity of securing the main water supply when repairs to or replacement of individual units of the system are required.

SUMMARY

The overall objective of the present invention is to provide a highly reliable but low-cost poultry drinker system. The savings which result from the invention are attributable to its simplicity which materially decreases initially the costs of manufacture and installation. The simplicity of the system, which has but few parts, and a minimum of moving parts, also insures that repairs and servicing will be infrequent and inexpensive.

Another subject of the invention is to provide a poultry watering system in which each watering station can easily be turned off or on without affecting the operation of the rest of the system, so that the number of stations in operation can be quickly adapted to requirements, and so that individual units can be replaced or serviced without interrupting the operation of the system.

Economy is achieved in the invention by taking advantage of the existing support means provided by feed troughs; tubing from the water supply is run parallel to the trough and attached to it, and drinking fountains are frictionally attached to tubing at desired intervals. A further advantage of attaching the watering system to the feeding system is a material reduction of floor space required by the combined as compared to separate systems. As the object of every poultry producer is to achieve higher density housing, the invention is an important advance. A few years ago it was considered highly efficient to use not more than one and one half square feet per bird; by using the invention only one-half of one square foot per bird is needed, and no point in the system is more than five feet from a drinker.

The individual drinker units of the invention employ the usual principle of arresting the flow of water to the drinking cup by means of the downward thrust of the cup as it is filled; in the invention, however, the area of contact between the drinking cup and its supporting stem is so negligible that friction is virtually eliminated.

Another important feature of the invention is its novel supply valve. Customarily in this art the valve seat has a soft and a hard element, and in most the conical part, that is, the jet or orifice, is hard, and the flat part, the seat, is soft. The result is that the hard conical part wears a groove in the soft flat part, and leakage occurs whenever the conical part fails to settle precisely into the groove thus created by use. In the invention in the preferred embodiment the conical orifice is a soft elastomeric material such as rubber, or plastic, and the seat or cap is hard. No groove is worn in the seat, and a good seal is insured even after long periods of use. By molding the seal, which also serves the function performed by the springs or floats in the prior art, and jet as a unit, the only elements which are subject to wear or deterioration can be replaced instantly and economically, without unthreading any part and without the use of tools.

Still another advantage of the invention is its new cutoff valve which is made possible by the slidable relationship between the drinker unit and the water supply. By lifting the fountain stem slightly, but without withdrawing it from the water supply tubing, the supply of water to the fountain is cut off. Further, by the use as a "plug" of a short length of piping of the same kind used in the fountain stem, the entire fountain may be removed or replaced with virtually no leakage of water. This plug is engaged with the lower end of the fountain stem, and is inserted through the bottom of the water supply tubing simultaneous with the withdrawal of the stem from the tubing. By reverse process the stem of a new fountain is inserted through the top of the tubing as the plug is withdrawn from the bottom of the tubing.

BRIEF DESCRIPTION OF THE DRAWINGS

Referring to FIG. 1 of the drawings, 1 represents a water supply tubing which by clips 2 is fastened to and supported by the tubing conduit 3, which is in turn by bolts 4 fastened to and supported by a conventional feed trough 5. Through holes 6 and 7, through tubing conduit 3, and water supply tubing 1, respectively, stem 8 passes vertically in slidable watertight relationship to water supply tubing 1 with which it is perpendicular. A tang 9 on stem 8 rests upon tubing conduit 3, so as to position the hole 10 within the passageway between the walls of water supply tubing 1. The upper end of stem 8 in a series of three stages 11 becomes progressively smaller in outside diameter and the inside diameter of stem 1 is materially reduced at its upper end to form a jet 12. A nozzle of elastomeric material 13 having a central orifice 14 is frictionally attached over and around the upper end of stem 8. Attached to nozzle 13 and extending radially outward therefrom is a diaphragm 15 which connects to washer 16, so as to make a watertight connection between cap 17 and the top edge of sleeve 18 of water cup 19. Cap 17 has a small hole 20 through which water may pass and it has a circular groove 21 around its interior close to and parallel to its lowermost edge. The groove 21 fits over a circular ring 22 around the exterior of sleeve 18 close to and parallel to the uppermost edge of sleeve 18. Plug 23 is a section of piping several inches in length of the same inside and outside diameters as stem 8. Stem 8 terminates at its lower end in peg 24 to which the upper end of plug 23 may be engaged when stem 8 is to be removed from water supply tubing 1, at which time plug 8 passes through holes 7 and 6 so as to seal holes 7.

DESCRIPTION OF PREFERRED EMBODIMENT

In the preferred embodiment a low pressure water supply is obtained by the use of a header tank, such as is common to other drinking systems, positioned about 40 to 60 inches above the water level in the drinking cup. A ½ inch hose or tubing of plastic is joined to the header tank. The tubing is carried within a sheet metal tubing conduit to which it is clipped, and the conduit is run parallel and clipped to a feed trough. At desired intervals along the feed trough holes are made through the top of the tubing conduit and through both walls of the water supply tubing of a diameter which will insure a tight leak-proof, but slidable connection with the stem of the drinker unit. These holes are made at right angles to the axis of the tubing conduit and tubing, and at such an angle radially as to insure that the stem of the unit will be perpendicular to the tubing and to the feed trough. The outside and inside diameters of the stem are approximately one-fourth inch and three-sixteenths inch respectively. The lower end of the stem is closed and is so shaped as to facilitate longitudinal engagement with the "plug" already referred to, and it contains a small opening about an inch and one-half from its lower end to permit water to flow from the tubing into the stem. The stem has a collar or tang about 2 inches from its lower end which limits the distance the stem may be inserted into the tubing; when the stem is inserted until the tang rests upon the tubing conduit, the opening therein is in register with the passageway of the tubing and water flows into the stem. When the stem is partially withdrawn from the tubing, i.e. to such an extent that the opening in the stem is no longer between the walls of the tubing, the flow of water is arrested. The stem is approximately 4 ½ inches long. A circular drinker cup has a diameter of about 2 7/16 inches and a depth of about 1 inch. Through the center of the cup is a round sleeve having an inside diameter of about eleven-sixteenths inch. The cup and sleeve are a single structure made of plastic, and the sleeve protrudes below the bottom of the cup about nine-sixteenths inch and above its bottom about three-eighths inch. The sleeve at its lowermost one-fourth inch has an inside diameter of five-sixteenths inch; this portion of the sleeve is the sole point of contact between the sleeve and the stem.

The upper end of the stem has reduced outside and inside diameters. Fitted over and around the upper end of the stem is a rubber tip containing a center orifice or nozzle. From the nozzle a diaphragm extends radially outward to form a rubber washer having an outside and inside diameter of five-eighths inch and one-half inch respectively, which washer rests upon the top of the sleeve portion of the drinker cup. The nozzle (or orifice) diaphragm, and washer, are all molded together as a unit and this unit has the following functions:

a. forms the lower portion or orifice of the valve
b. forms a water-tight seal between the stem and the sleeve of the cup
c. resiliently suspends the cup from the stem.

A round cap is frictionally attached over the upper end of the sleeve of the drinker cup, resting upon the rubber washer surrounding the diaphragm and making the necessary watertight seal between the cap and the upper end of the sleeve. The cap is flat at the inner surface of its top and acts as the upper portion of the valve. The cap has a small hole just above the level of the washer.

In operation water leaves the header tank by means of the tubing, enters the stem through the opening therein which is in register with the inside of the tubing, flows out of the orifice in the upper stem through holes in the cap into the drinker cup. As the cup fills the weight of the water therein causes the cap of the valve to rest upon the rubber portion of the valve with increasing pressure, thereby closing the opening. The resilience of the diaphram causes the cup to be lifted at any time water is removed from the cup, thereby again opening the valve.

The lower end of the sleeve being slightly larger at its bottom than the stem, makes only narrow and occasional contact with the stem from time to time as the cup moves up and down, thus eliminating friction, the chief source of trouble in other systems.

It can be seen that to discontinue the operation of a unit it is necessary only to raise the stem about an inch to stop the flow of water, and to lower it again when its use is again required. By using a "plug" of the type already described an entire unit may be removed for repair or replacement without affecting the other parts of the system.

While the foregoing fully describes my invention, it is not to be understood as being limited to the details so set forth. My invention is of the full scope of the following claims:

1. In a watering system for poultry adapted to be mounted on a feeding trough and including water supply tubing extending along said trough, a drinker unit having a water holding cup and a flow control valve, and a stem serving as a fluid connector and support member between said drinker unit and said water supply tubing, the improvement comprising said stem and said water supply tubing having a connection that permits regulation of water flowing from said tubing into said stem, said connection including two apertures formed in said tubing in alignment with each other and of a size to receive said stem in a slidable watertight relationship when said stem is passed through said apertures, and said stem having a fluid passage extending from an aperture in the wall of said stem to said flow control valve and having a length that permits said stem to be positioned in a first position where said aperture in the wall of said stem is within said tubing and a second position where said stem passes through said apertures formed in said tubing but said aperture in the wall of said stem is outside of said tubing whereby water may flow from said tube to said flow control valve only when said stem is in said first position.

2. The water supply system of claim 1 wherein said water supply tubing is formed from a resilient material whereby the resilience of said tube in the region of said two apertures assures said watertight relationship.

3. The water supply system of claim 1 wherein said stem has peg closure means on the end of said stem opposite from said drinker unit, said peg having a shape to receive a plug member with said plug member having substantially the same outer dimension as said stem and a length greater than the thickness of said water supply tubing whereby said plug member may be positioned with said peg and slid through said two apertures so that said drinker unit and stem may be removed from said tubing yet said plug member will prevent the flow of water through said two apertures.

* * * * *